Figure 1:
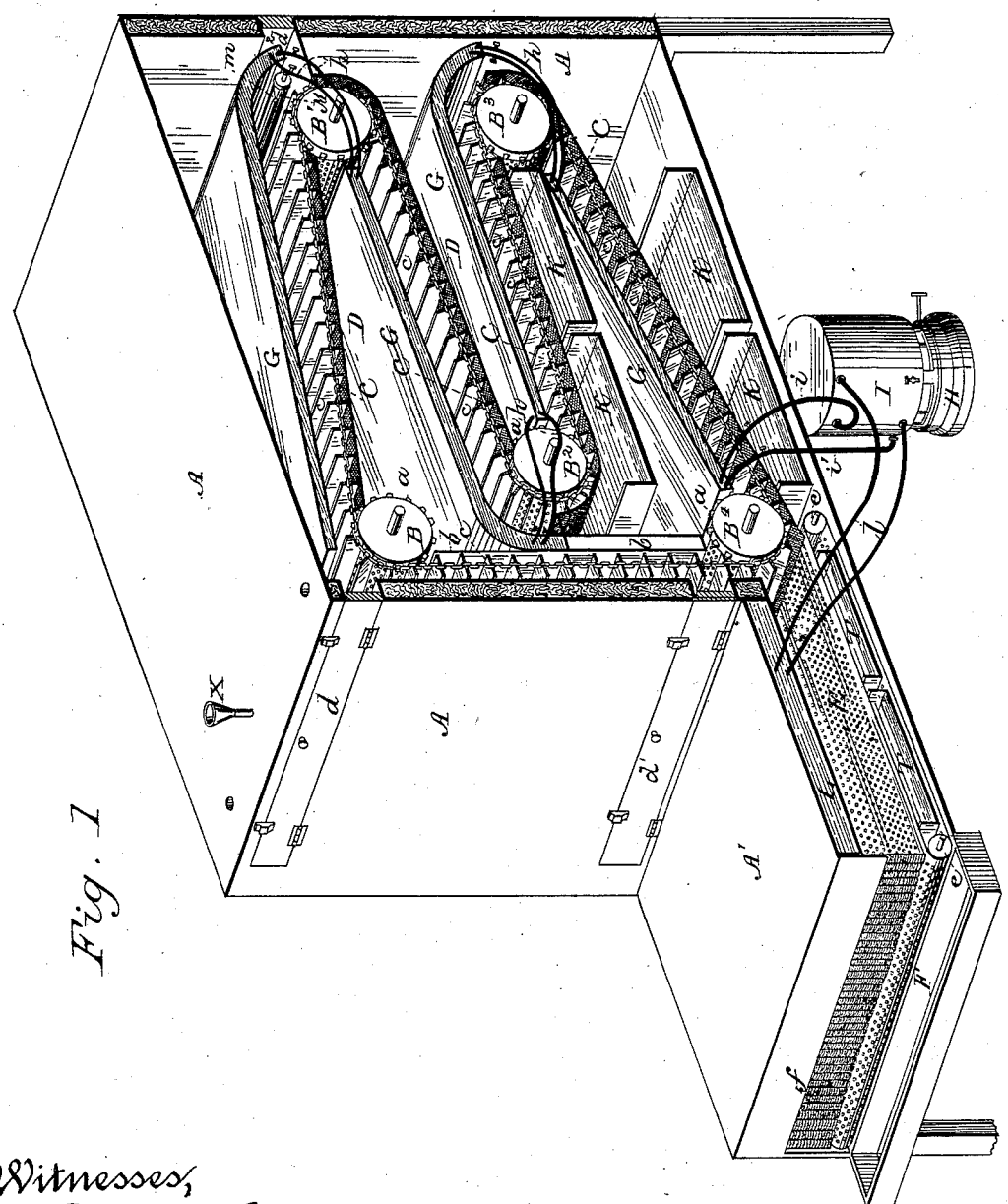

(No Model.) 3 Sheets—Sheet 1.
C. F. WINKLER.
INCUBATOR.

No. 286,756. Patented Oct. 16, 1883.

Witnesses,
Geo. H. Strong.
J. H. Krouse

Inventor,
C. F. Winkler
By Dewey & Co.
Attorneys

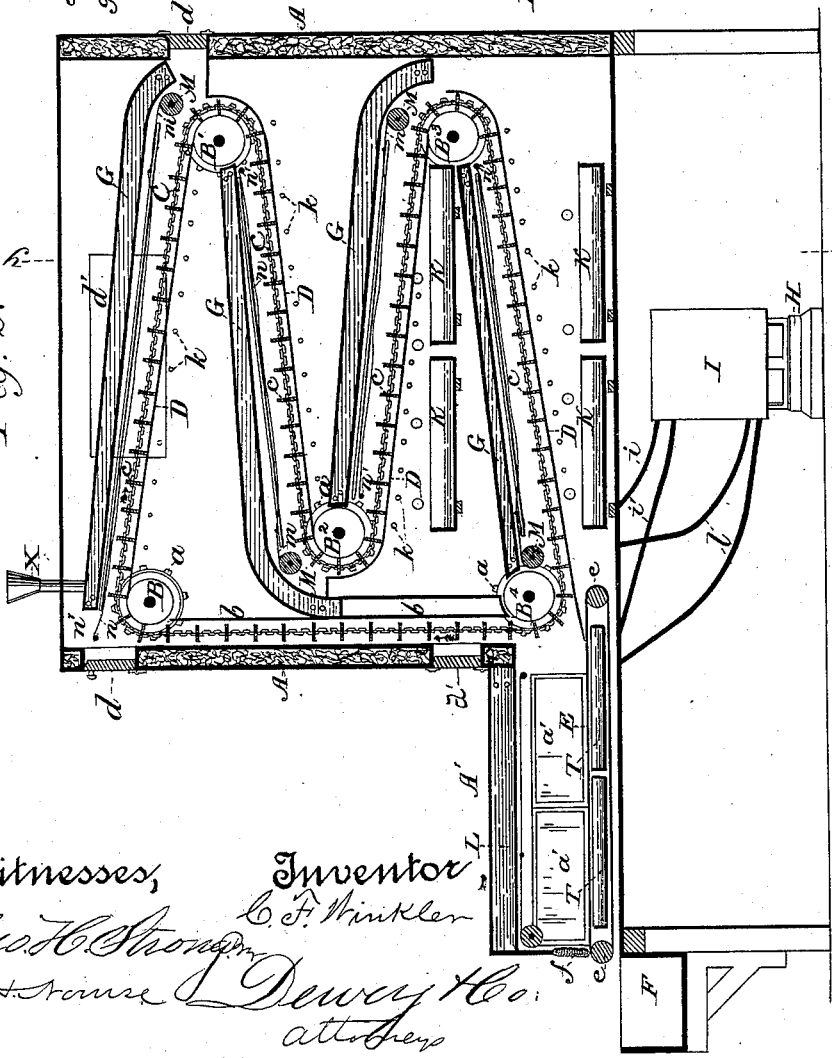

(No Model.) 3 Sheets—Sheet 3.
C. F. WINKLER.
INCUBATOR.
No. 286,756. Patented Oct. 16, 1883.

Witnesses, Inventor,
Geo. H. Strong C. F. Winkler
Lassrune By Dewey & Co.
Attorneys

UNITED STATES PATENT OFFICE.

CHARLES F. WINKLER, OF BAKERSFIELD, CALIFORNIA.

INCUBATOR.

SPECIFICATION forming part of Letters Patent No. 286,756, dated October 16, 1883.

Application filed May 17, 1883. (No model.)

*To all whom it may concern:*

Be it known that I, CHARLES F. WINKLER, of Bakersfield, county of Kern, State of California, have invented an Improvement in an Incubator; and I hereby declare the following to be a full, clear, and exact description thereof.

My invention relates to certain new and useful improvements in the class of incubators employing an endless traveling conveyer for receiving and advancing the eggs; and the invention consists in novel features of construction and combination of parts, all as will be hereinafter fully described, and set forth in the claims hereto annexed.

The object I have in view in this invention is to overcome certain patent difficulties which attend the operation of machines now in use. A brief recital of these will serve to explain more clearly my object. During the progress of incubation the temperature must vary. At the beginning the eggs require a greater heat than at the close, because toward the end the embryo, having increased, furnishes a certain amount of heat for itself. For this reason the temperature produced by the apparatus should be gradually decreased during the process. This necessitates the complete charging of the incubator at the start. One lot of eggs cannot be introduced to-day and another in a week, because the temperature would be unsuitable for either one lot or the other. In large machines this immediate and large collection of eggs presents the difficulty of getting them fresh enough, or requires an outlay of money. My machine is so constructed as to allow the introduction of a fresh lot of eggs at short intervals, and gives to each lot its own required temperature. This enables me to use successively perfectly fresh eggs without trouble, and makes the process continuous, which is a very desirable result in poultry-raising. Again, when all the eggs have reached an equal stage, and the young begin to come out, they are all crowded in the same apartment, or many are in several chambers. They hatch practically simultaneously, so that a great many are always wet. This necessitates the constant opening of the doors to remove them, which, by lowering the temperature, affects injuriously the other eggs; or, if allowed to remain, the young, in struggling about while still wet, smear the unhatched eggs and prevent their hatching; or they injure themselves on the broken shells or in the interstices between the eggs. My machine hatches them in small batches removed from the unhatched eggs, so that the temperature is not lowered by removing them, nor are they injured, nor do they injure the other eggs. Again, the ordinary machines are not adapted for all kinds of eggs, (goose, turkey, duck, and chicken eggs placed therein promiscuously,) because these having different periods of incubation, the periods of temperature for one kind will not answer for another. My machine provides for this, so that I am enabled to place all kinds of eggs and give to each its required period and temperature. These are some of the difficulties which I overcome. The various other and minor advantages which I gain will appear during the course of the following description of the construction, which will be clearly seen by reference to the accompanying drawings, in which—

Figure 4:
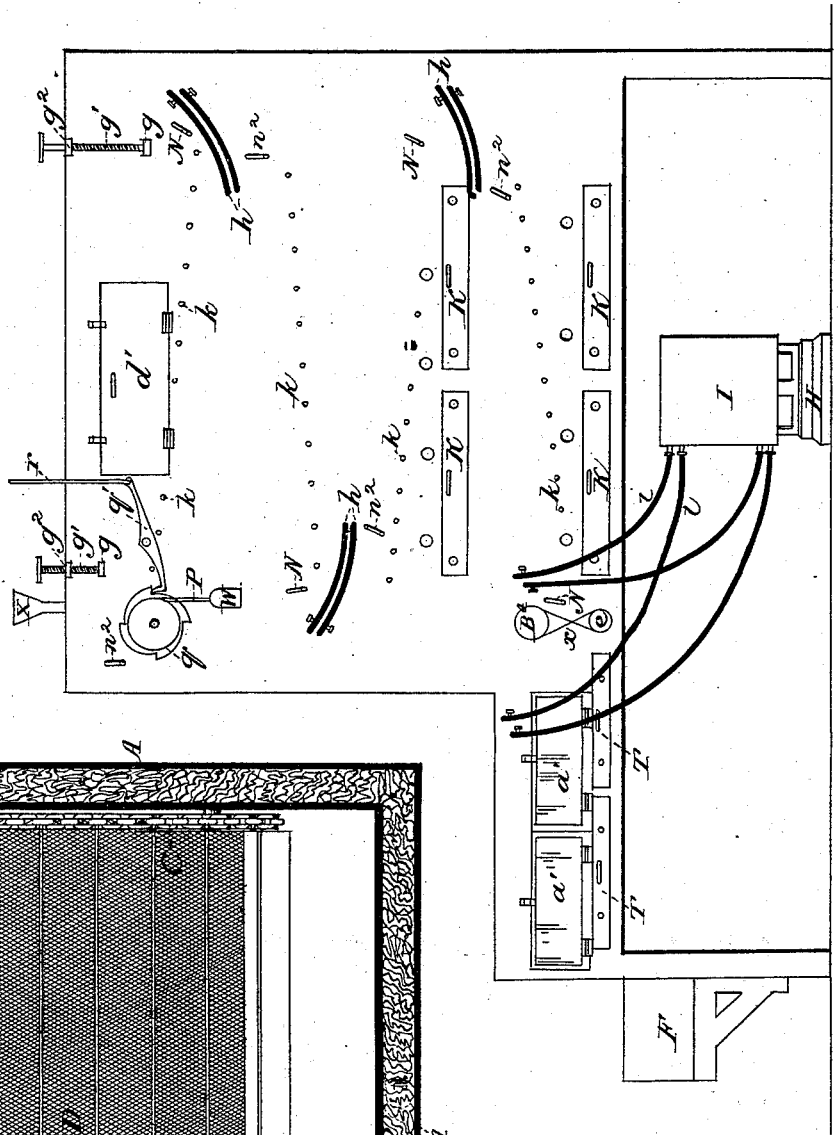
Figure 5:
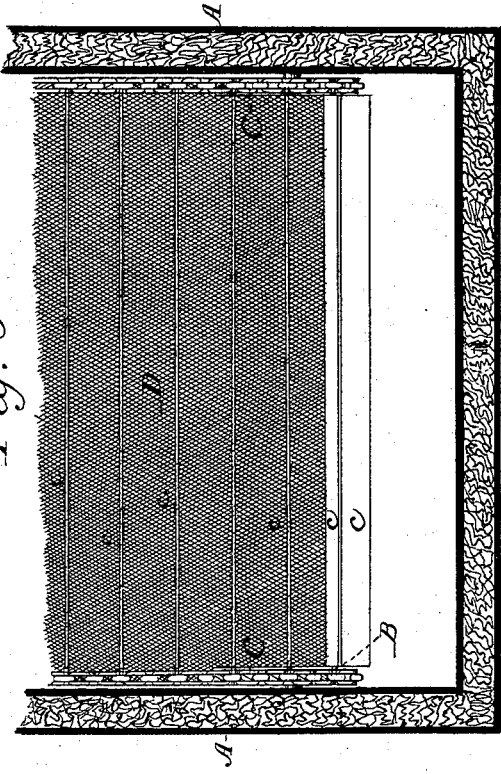

Figure 1, Sheet 1, is a perspective view of my machine, having one of its sides removed to show the interior. Fig. 2, Sheet 2, is a vertical longitudinal section of same. Fig. 3 is a cross-section on line $y\ y$, Fig. 2. Fig. 4, Sheet 3, is a side elevation of same. Fig. 5 is a portion of a plan, showing the conveyer.

A is the casing of the machine, having double-spaced walls filled with some non-conducting material.

B is a hollow drum perforated over its surface, and mounted transversely in the sides of the machine near its top at one end. B' is a similar drum, mounted in the other end and a little lower down. $B^2$ is a drum mounted in the first end, lower down and a little farther in. $B^3$ is a drum at the other end, and $B^4$ a drum at the bottom in the first end.

C C are endless chains passing over the ends of the drums, and following a course from B down to and around B', to and around $B^2$, to and around $B^3$, to and around $B^4$, and up vertically behind an inner wall $b$, to the point of beginning. The ends of the drums are provided with teeth or pins $a$, similar to a sprocket-pulley, for engaging with the links of the chains and insuring a positive motion therefor. On account of the position of the drums the course of the chains is inclined downwardly to drum B⁴. Secured at short intervals in the chains are the tranverse slats c, which form a conveyer, as I shall explain. These slats are secured to the chains at the middle line of their ends, thus making half the width of the slat below and half above the chains, for the reason that in turning around the drums they become reversed edge for edge. These slats travel over flooring D. This may consist of any perforated material, wire screen being preferable, to permit ventilation. This flooring is in sections, the uppermost piece lying between the drums B B', the next between drums B' B², and so on down. The top section is straight; but the others are bent around the upper drum of each, following its curvature to a point above its center, in order to receive and guard the eggs when traveling around the drum, and to keep them to their places between the slats. The lowest of these flooring-sections opens down upon an endless perforated belt or carrier, E, placed in a horizontal plane, and traveling over rollers e within an extension, A', of the main casing A.

I shall now explain the operation and advantages of the devices as far as described.

In one end of the machine, at its top, is a door, d, another, d', in its sides, below the former, and another, d², in its other end. The conveyer, consisting of the chains and slats, travels downward at certain times by means which I shall hereinafter describe. The length of the belt and the distances of its periodical progression are so regulated that from the point where a slat, c, passes the door d² to the point where it turns and begins to ascend will be about nineteen days. This period covers the time during which it is found necessary to turn chicken-eggs. From the point where the conveyer passes the door d' to the lowest point, the period is from twenty-five to twenty-eight days, and from the very top at door d to bottom it is about thirty days. These periods cover the time necessary for turning other than chicken-eggs. The eggs are placed between the slats c and rest upon the floors D. The chicken-eggs are placed into the conveyer through the door d², the duck and turkey eggs through the door d', and the goose-eggs through door d. Knowing the times at which the conveyer is advanced its set distance, I am ready with a fresh lot of eggs to put through the doors into the slats which are within reach. At the next time, these eggs have been carried forward and empty slats presented, into which I put another lot, and so on. In this way I put in, at short intervals, a limited number. The eggs being discharged below, the slats ascend empty, and the operation is continuous. The turning of the eggs is entirely automatic, for the reason that they rest on a stationary downwardly-inclined floor, and are advanced by the traveling slats, between which they lie. They thus roll, and the distance which the conveyer advances at one time is regulated to turn them a quarter or a half a turn, as the case may be. The curved ends of the floor-sections D receive the eggs as they come around the drums. When they reach the bottom the chicks will have picked the shells, and the eggs must not thereafter be turned. This is the object of the horizontal traveling carrier E. This carrier is advanced at intervals at such a rate that it may take, say, about three days to reach the end. The eggs do not roll on the carrier, but are advanced. The chicks come out, and are removed through side doors, a', while the shells and bad eggs continue, and are discharged through the open end of the extension A' into a receptacle, F. The end of the extension is preferably covered by a fringe, f. It will be observed that the place in which the chicks are hatched is sufficient in area not to be crowded, thereby giving the chicks a fair chance, and they are sufficiently removed from the other eggs yet in process to prevent injury to them.

I shall now describe the means by which I obtain the desired temperature.

Over the conveyer, above all its folds and following its inclination, are the sections of water-jacket G. These are independent of each other, and are suspended at their ends by means of blocks g, projecting through slots in the casing A, and the screws g', attached at their lower ends to the blocks g, and passing vertically through suitable holes in the blocks g², Fig. 4. By turning these screws each section of water-jacket may be raised or lowered independently. The ends of these sections are curved, where necessary, to follow the course of the conveyer, and they are preferably tapered to their upper ends, in order to reduce their thickness and provide for a greater vertical play in small space. The ends of the sections of water-jacket G are connected with each other by two flexible pipes, h. Of these, one joins the bottoms of the jackets and the other the tops, whereby the free circulation of the hot and cold water is permitted. Under the machine are the coal-oil stoves H, having the boilers I. From the tops of these boilers extend flexible pipes i to the upper portion of the lower end of the lowest section of water-jacket G. Flexible pipes i' join the bottom of the boilers with the lower portion of said sections. These connecting-pipes, being flexible, permit the adjustment of each section of water-jacket. It is through the means of this adjustment that I obtain the required heat for all stages of the operation. As hot water goes to the top, it will be found that the uppermost water-jacket will be the hottest, and so on down, and as greater heat is required at the beginning of the process, this is the suitable condition. After the machine has been set up and tested, it will readily be seen what difference in temperature exists between each of the sections. Then by vertically adjusting the water-sections they may be brought in closer proximity to or farther from the eggs, in order to give them the heat required at whatever stage of the process they may be. In like manner, the adjustment of one end of a section will provide for any change in temperature which may be required in the extent of one fold of the conveyer.

X is the funnel, through which the water-jacket and boilers are filled. Small holes $k$ through the sides of the casing A provide for the admission of fresh air under the perforated floor-sections. Under the lower two floor-sections I have the water-trays K, to provide moisture during the later stages of the process, when it is most needed. Over the horizontal carrier E, I have a separate water-jacket, L, which is connected with the top and bottom of boiler by pipes $l$. The heat of this is regulated to give the required temperature during the very latest stages of incubation.

The eggs require to be cooled about once a day. This I do by the following means: Mounted transversely in the casing over the bends or turns in the conveyer, and between it and the water-jackets, are rollers M, upon which are wound curtains $m$, of some kind of cloth or fabric. With the edges of these are connected strings $n$, which extend over the conveyer, and are wound on a shaft, $n'$, having crank $n^2$. By winding these strings the curtains are unwound and lie over the eggs, shielding them from the heat. When sufficiently cool, they are wound back upon their rollers. This is done by small cranks N on their ends, though I may provide them with springs to operate automatically, as ordinary window-curtains work.

In Fig. 4 I show a portion of the means by which I cause the periodical advancement of the conveyer. The end of drum B, or a gudgeon thereon, projects through the side of the casing, and has a cord, P, wound thereon. This cord suspends a weight, W, which is sufficient, with the weight of the conveyer and its eggs, to cause said conveyer to advance with a positive motion. Upon the drum is a ratchet, $q$, with which a pivoted latch, $q'$, engages. The outer arm of this latch is heavy enough to cause its point to engage with the ratchet and hold the drum stationary. The end of the latch is connected by a rod, $r$, with clock-work, which I have not deemed it necessary to show here. At stated periods—say every six hours—the clock-work raises rod $r$, withdrawing the latch from the ratchet momentarily. The drum then turns, advancing the conveyer. The rod is immediately relieved, and the latch drops back to engage with the next tooth of the ratchet and stop the conveyer. By regulating the diameter of this ratchet the advancement of the conveyer is rendered definite. Between the top and bottom of the horizontal carrier E are water-trays T, for supplying moisture. In order to impart a forward motion to the horizontal carrier E, I have the cross-belt $x$, Fig. 4, from the drum $D^4$ to one of the rollers $e$.

Having thus described my invention, what I claim as new, and desire to secure by Letters Patent, is—

1. In an incubator, a conveyer for receiving the eggs, and means for advancing said conveyer periodically, in combination with heating devices arranged to give the heat requisite at all points during the progress of the eggs, substantially as and for the purposes herein described.

2. In an incubator, a conveyer for receiving the eggs, consisting of spaced slats, between which the eggs lie, and means for advancing it, in combination with an inclined floor, down which the conveyer travels and upon which the eggs rest, whereby they turn with the advancement of the conveyer and their own progress, substantially as and for the purposes herein described.

3. In an incubator, the drums B, B', $B^2$, $B^3$, and $B^4$, having teeth $a$, the endless chain C C, having spaced cross-slats $c$, and a means for advancing said chains and slats, in combination with the perforated floor-sections D, over which the slats travel, substantially as and for the purpose herein described.

4. In an incubator, the hollow perforated drums B, B', $B^2$, $B^3$, and $B^4$, having teeth $a$, the endless chains C C, having spaced cross-slats $c$, and a means for advancing said chains and slats, in combination with the perforated floor-sections D, having their upper ends concentric with the drums for a short distance, substantially as and for the purpose herein described.

5. In an incubator, the casing A, having doors $d$ $d'$ $d^2$, in combination with the endless egg-conveyer consisting of the endless chains C C and cross-slats $c$, passing said doors, and a means for advancing said conveyer, substantially as and for the purpose herein described.

6. In an incubator, the drums B B' $B^2$ $B^3$ $B^4$, the endless chains C C and spaced slats $c$, and means for advancing said chains and slats, and the perforated floor-sections D, in combination with the water-jackets G, placed over the slats, and means for heating the water therein, substantially as and for the purpose herein described.

7. In an incubator, the drums B B' $B^2$ $B^3$ $B^4$, the endless chains C C and spaced slats $c$, and means for advancing said chains and slats, and the perforated floor-sections D; in combination with the superposed sections of water-jacket G, means for heating the water therein, and means for adjusting them vertically, substantially as and for the purpose herein described.

8. In an incubator, the tortuous conveyer consisting of the endless chains C C and cross-slats $c$, and means for advancing it, and the perforated floor-sections D, in combination with superposed sections of water-jacket G, means for vertically adjusting them independently, the flexible connecting-pipes $h$, the boilers I, and flexible connecting-pipes $i$ $i'$, substantially as and for the purpose herein described.

9. In an incubator, the tortuous conveyer, as herein described, and means for advancing it, in combination with the horizontal endless carrier E and means for actuating it, substantially as and for the purpose herein described.

10. In an incubator, the tortuous conveyer consisting of the endless chains C C and spaced cross-slats c, and means for advancing it, and the downwardly-inclined floor-sections D, upon which the eggs roll, in combination with the horizontal endless carrier E and means for actuating it, substantially as and for the purpose herein described.

11. In an incubator, the tortuous traveling conveyer, as herein described, in combination with the endless traveling carrier E, the superposed water-jacket L, the boilers I, and connecting-pipes l, substantially as and for the purpose herein described.

12. In an incubator, the traveling conveyer, as herein described, and the superposed sections of water-jacket G, in combination with the intervening curtains, m, substantially as and for the purpose herein described.

13. In an incubator, the traveling conveyer, as herein described, and the superposed sections of water-jacket G, in combination with the rollers M, the curtains m thereon, and the draw-strings n, substantially as and for the purpose herein described.

14. In an incubator, the endless conveyer, as herein described, in combination with the means for advancing it periodically, consisting of the driving-drum B, the rope P, and weight W, and the holding mechanism consisting of the ratchet q and pivoted latch q', which are to be operated by a momentary releasing mechanism, substantially as and for the purpose herein described.

In witness whereof I have hereunto set my hand.

CHARLES F. WINKLER.

Witnesses:
WM. F. BOOTH,
J. H. BLOOD.